United States Patent
Yang et al.

(10) Patent No.: US 7,220,007 B2
(45) Date of Patent: May 22, 2007

(54) OUTER SUSPENSION TYPE LENS SHIELDING MASK FOR PROJECTION APPARATUS

(75) Inventors: Chih Chung Yang, Miao-Li (TW); Hsi Chih Sun, Miao-Li (TW); Hua Wen Fan, Miao-Li (TW)

(73) Assignee: Coretronic Corporation, Miao-Li County (TW)

( * ) Notice: Subject to any disclaimer, the term of this patent is extended or adjusted under 35 U.S.C. 154(b) by 0 days.

(21) Appl. No.: 11/548,978

(22) Filed: Oct. 12, 2006

(65) Prior Publication Data

US 2007/0070306 A1    Mar. 29, 2007

Related U.S. Application Data

(62) Division of application No. 11/453,137, filed on Jun. 15, 2006, which is a division of application No. 10/952,836, filed on Sep. 30, 2004.

(30) Foreign Application Priority Data

May 24, 2004    (TW)    ................................ 93114660 A

(51) Int. Cl.
  *G03B 21/14*    (2006.01)
  *G03B 21/00*    (2006.01)
  *G03B 21/22*    (2006.01)

(52) U.S. Cl. .......................... 353/97; 353/122; 353/119

(58) Field of Classification Search .................. 353/97, 353/88, 122, 92, 119; 359/738, 739
See application file for complete search history.

(56) References Cited

U.S. PATENT DOCUMENTS

2004/0021836 A1    2/2004    Hamada
2005/0030493 A1    2/2005    Wu
2005/0041222 A1    2/2005    Haba

OTHER PUBLICATIONS

Edward H. Stupp and Matthew S. Brennesholtz, Projection Displays, Copyright 1999 by John Wiley & Sons Ltd, ISBN 0-471-98253-9 (see p. 14, table 2.1).

*Primary Examiner*—Melissa Jan Koval
*Assistant Examiner*—Andrew Kong
(74) *Attorney, Agent, or Firm*—Birch, Stewart, Kolasch & Birch, LLP

(57) ABSTRACT

An outer suspension type lens shielding mask for a projection apparatus including a sheet body and holding element, in which a rectangular hole is opened in the sheet body, and the sheet body is combined with the holding element to be fixed on a projection apparatus. Another outer suspension type lens shielding mask includes a base plate, in which a rectangular hole is opened in the middle part thereof, and upper and lower adjustable plates are installed behind the base plate. An open rectangular notch is respectively disposed at the middle parts of the upper and the lower adjustable plates. An adjustment mechanism includes a plurality of connecting elements connected to the base plate and the upper and the lower adjustable plates for adjusting the relative positions thereof, to avoid bad shadows yielded outside of a picture due to light diffraction and improve the quality of visual amusement.

3 Claims, 8 Drawing Sheets

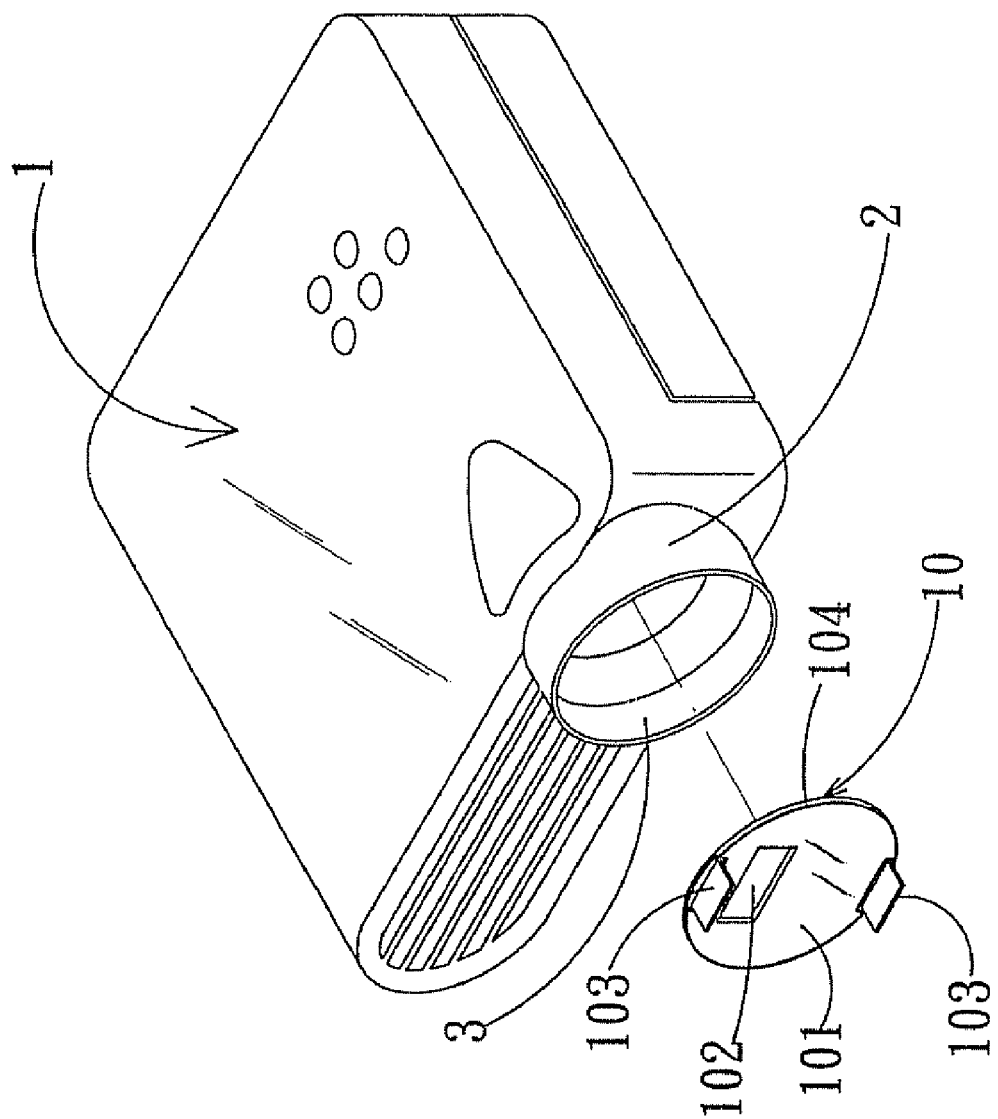

US 7,220,007 B2

OUTER SUSPENSION TYPE LENS SHIELDING MASK FOR PROJECTION APPARATUS

This application is a Divisional of co-pending application Ser. No. 11/453,137, filed on Jun. 15, 2006, which is a divisional of application Ser. No, 10/952,836, filed on Sep. 30, 2004, and for which priority is claimed under 35 U.S.C § 120; and this application claims priority of Application No. 093114660 filed in Taiwan, R.O.C. on May 24, 2004 under 35 U.S.C. § 119; the entire contents of all are hereby incorporated by reference

BACKGROUND OF THE INVENTION

1. Field of the Invention

The present invention relates to an outer suspension type lens shielding mask for a projection apparatus, and more particularly to a lens shielding mask mounted outside of a projection lens and designed for matching all kinds of aspect ratios of projection pictures to reduce the leaking of the diffusion light outside of the picture.

2. Description of Related Art

Diffusion light is yielded in a general projector when light is experienced a several reflection and projection after it is emitted from an optical engine. And, a contrast is lowered after the diffusion light is leaked out through the projection lens so that the quality of a dark scene is influenced when the projector is used on such as a home video picture playing.

Therefore, for lowering the darkness of the dark scenes of a motion picture in a projector to enhance the performance of contrast, an optical grating is always added in an optical engine system. But, not only needs it to add elements in entire optical engine or change a design but also helps it nothing for a currently existed projector model if the optical grating is added in the optical engine. Therefore, substantially, it is necessary to add an optical grating device without changing the internal structure of a current projector and increasing production cost

SUMMARY OF THE INVENTION

The main object of the present invention is to provide an outer suspension type lens shielding mask for a projection apparatus, capable of being mounted outside of a projection lens and being designed to a static optical grating or adjustable optical grating matching with every kind of different aspect ratio of projection picture.

Another object of the present invention is to provide an outer suspension type lens shielding mask for a projection apparatus, capable of reducing production cost by elevating the picture quality from the outside of the projection apparatus without changing the design of an optical engine.

Still another object of the present invention is to provide an outer suspension type lens shielding mask for a projection apparatus, capable of avoiding bad shadow outside of a picture caused from diffraction light so as to improve the quality of sight amusement.

For attaining to the objects mentioned above, an outer suspension type lens shielding mask for a projection apparatus according to the present invention comprises a sheet body and a holding element, in which a rectangular hole is opened in the sheet body and the sheet body is combined with the holding element together for being fixed on a projection apparatus. Another outer suspension type lens shielding mask according to the present invention comprises a base plate, in which a rectangular hole is opened in the middle part thereof, upper and lower adjustable plates, installed behind the base plate and an open rectangular notch is respectively disposed at the middle parts of the upper and the lower adjustable plates, and an adjustment mechanism, consisting of a plurality of connecting elements connected to the base plate and the upper and the lower adjustable plates for adjusting the relative positions of the upper and the lower adjustable plates on the base plate.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description

BRIEF DESCRIPTION OF THE DRAWINGS

The present invention will become more fully understood from the detailed description given hereinbelow and the accompanying drawings, which are given by way of illustration only, and thus are not limitative of the present invention, and in which:

FIGS. 2A and 2B are schematic views, showing a motion for mounting a lens shielding mask with a fixed type optical grating onto a projection apparatus;

DETAILED DESCRIPTION OF THE PREFERRED EMBODIMENTS

Figure 1:
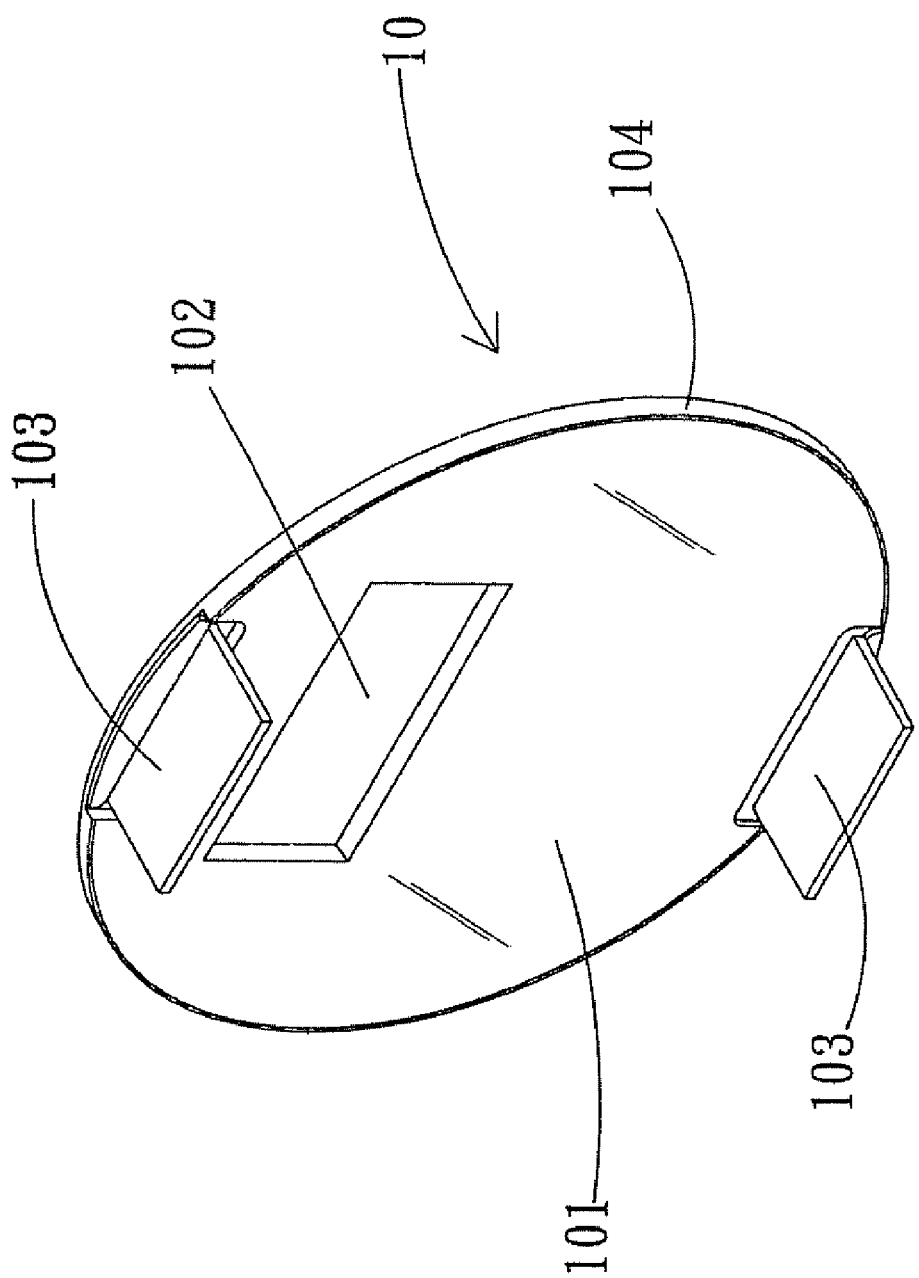
FIG. 1 is a prospective view, showing a lens shielding mask with a fixed type optical grating of a preferred embodiment according to the present invention.
Figure 2B:
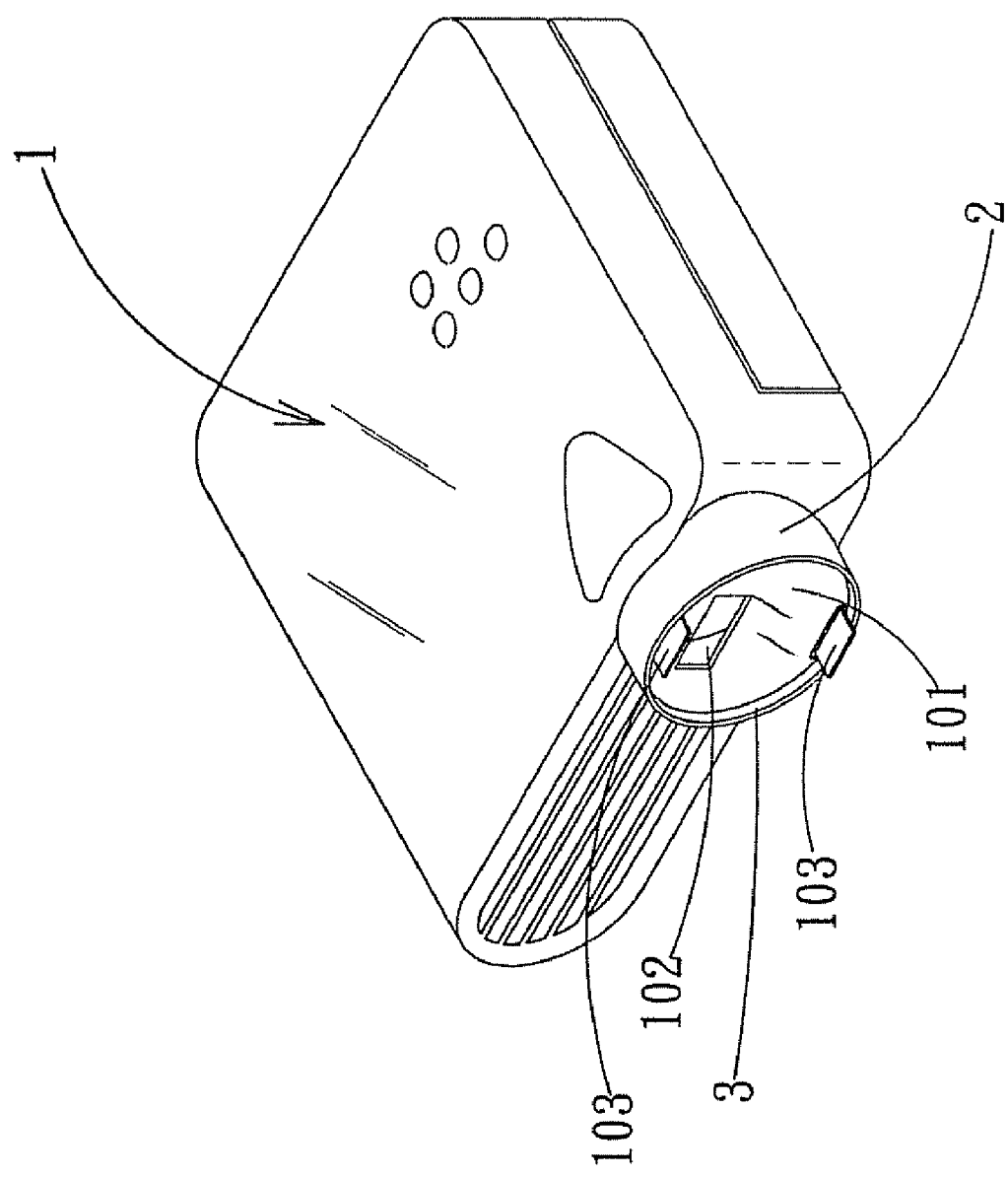

Please refer to FIG. 1. FIG. 1 is a prospective view showing a lens shielding mask with a fixed type optical grating of a preferred embodiment according to the present invention. A lens shielding mask 10 with a static optical grating mainly comprises a circular disc type sheet body 101 made from an opaque material or a flat plate coated with an opaque material on the surface thereof and used for shielding diffraction light projected from a lens of a projector; the diameter thereof is approximately equal to the inner diameter of a outer frame in front of the lens of the projector as FIGS. 2A and 2B show. A rectangular hole 102 whose shape and location depend on the type of the lens is opened in the sheet body 101. Because the aspect of a general picture is 16:9, although the ratio of the length and the width of the rectangular hole is always fabricated to be 16:9, but it can also be fabricated to be 4:3 or even 2.35:1 for accommodating it to a different aspect ratio. The hole 102 is deviated from the center of the sheet body 101 according to the present invention. A plurality of clamping ears 103 are disposed around the circumference of the sheet body 101. These clamping ears can be formed with the sheet body 101 into one body or combined with the sheet body 101 by means of adhesion or welding. The numbers and the locations of the clamping ears 103 are not particularly defined, only that a user can mount the lens filtering mask 10 conveniently on the outer frame of the lens of the projector is enough. In addition, a material such as fiber can be stuck on the circumference of the circular sheet body 101 for being taken as a clamping element to allow the sheet body to be engaged tightly in the outer frame of the lens.

The motion for mounting the lens filtering mask with a fixed type optical grating mentioned above can be seen in FIGS. 2A and 2B. A user only uses his fingers to clip the clamping ears 103 on the sheet body 101 and aims the mask at and then mounts it on the outer flame 3 outside of the lens 2 of the projector 1. Thereafter, the fingers are again used to clip the lens filtering mask 10 to rotate the sheet body 101 until the rectangular hole is aligned with a formation zone of image after the lens shielding mask 10 is mounted on the outer frame 3.

Figure 3:
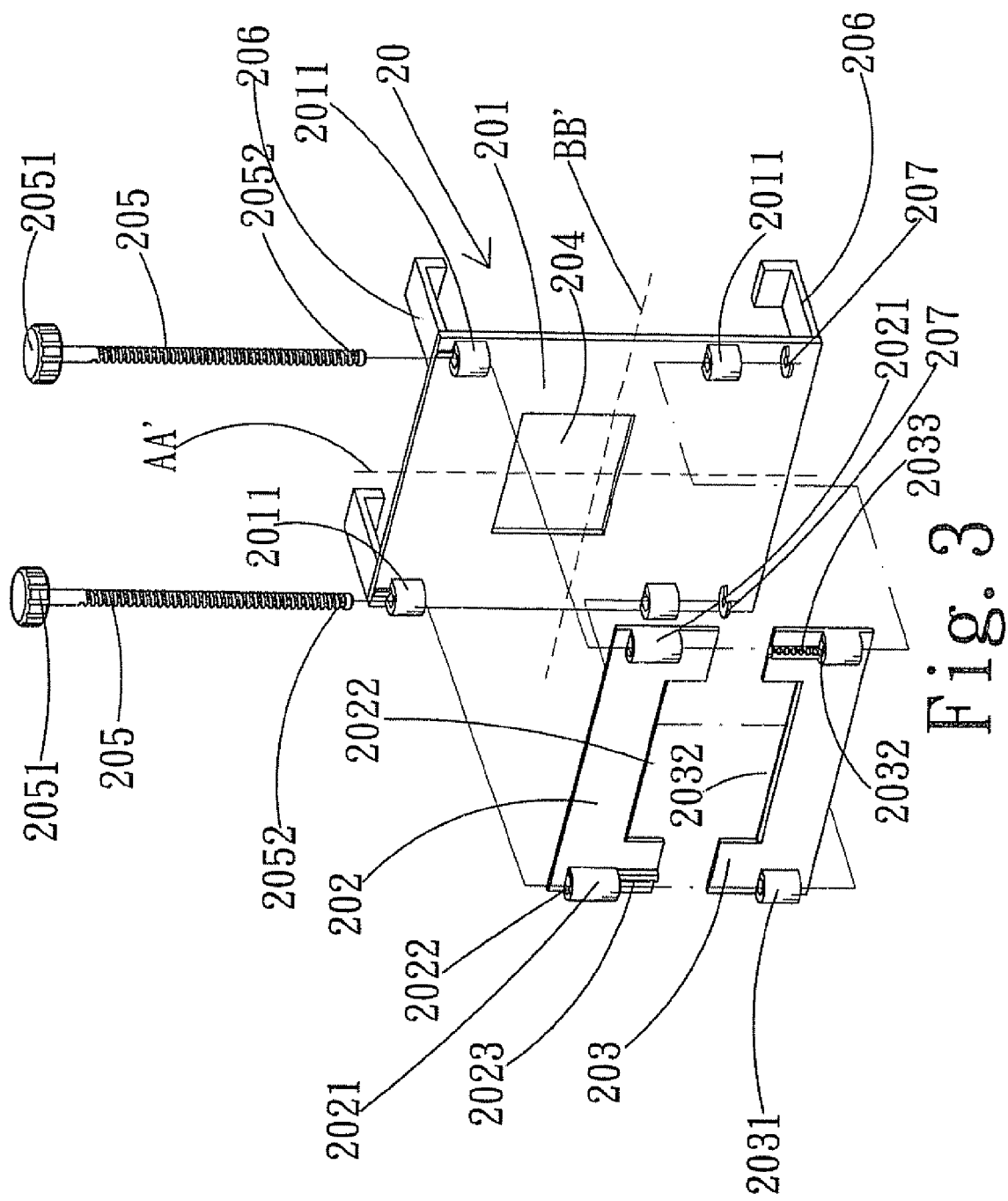
FIG. 3 is an explosive view, showing a lens shielding mask with an adjustable optical grating of another preferred embodiment according to the present invention.
Figure 4:
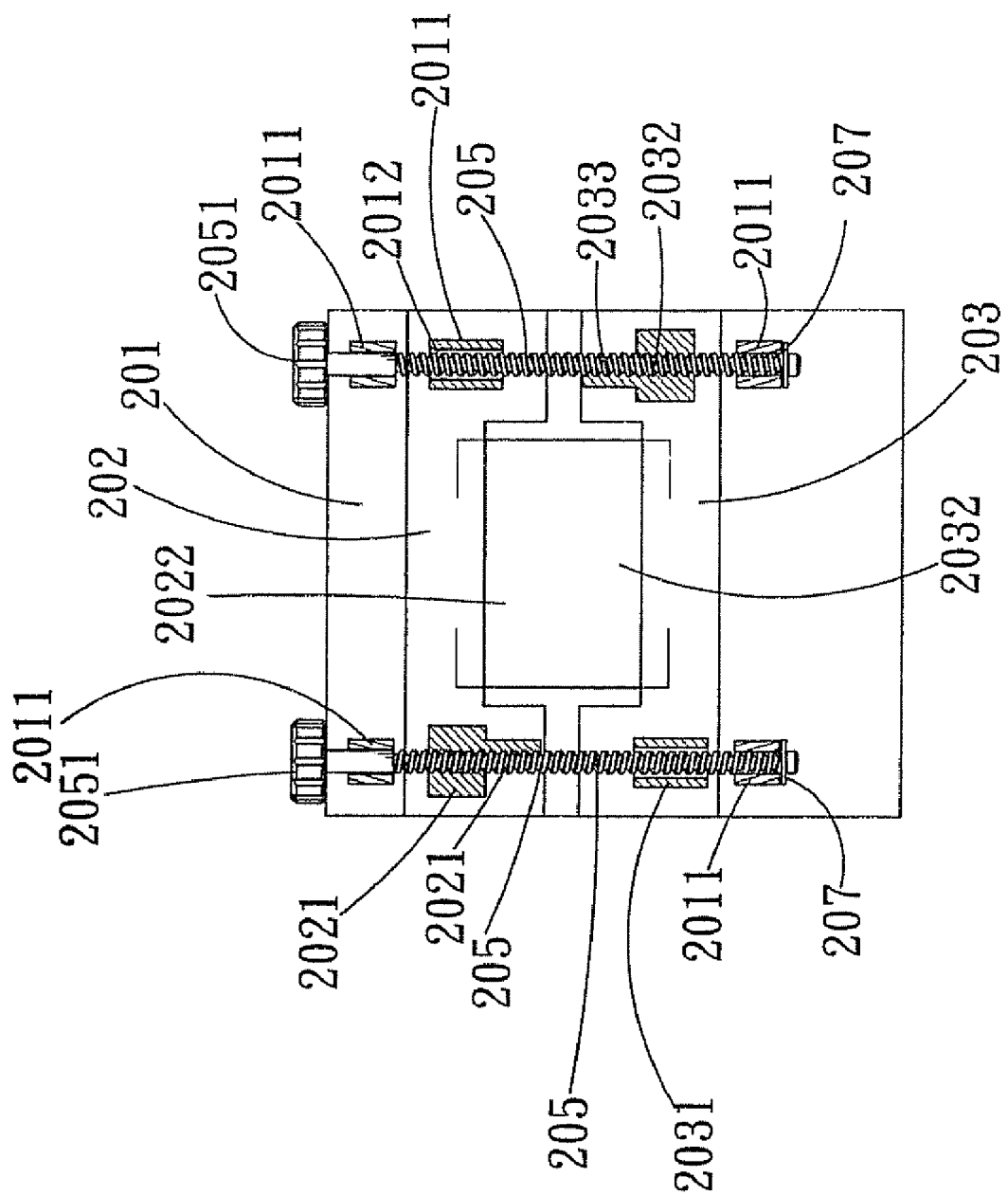
FIG. 4 is a cross sectional view, showing an assembled lens shielding mask with an adjustable optical grating of another embodiment according to the present invention.

Next, please refer to FIGS. 3 and 4. FIGS. 3 and 4 are explosive and cross sectional views respectively showing parts and after-assembly structure of a lens shielding mask with an adjustable optical grating of another preferred embodiment according to the present invention. A lens filtering mask 20 with an adjustable optical grating comprises a base plate 201 and upper and lower adjusting plates 202 and 203. A sleeve 2011 is disposed at each corner of the base plate 201 and a rectangular hole 204 whose shape and location is disposed depending oil the aspect of a lens is opened in the base plate 201; according to the present invention, the hole is symmetrical to a center line in the direction of the width of the base plate (i.e. line A–A' in FIG. 3), and the center point of the hole 204 is also disposed at a location beyond the center line in the direction of the length of the base plate (i.e. line B–B' in FIG. 3) according to the design of the location of a picture projected from a general projector. Furthermore, open type rectangular notches 2022 and 2032 are respectively disposed at the centers of the lower edge of the upper adjusting plate 202 and the upper edge of the lower adjustable plate 203, the sizes of these two open type rectangular notches 2022 and 2032 are same and corresponding to each other. And, sleeves 2021 and 2031 are respectively disposed at both of the left and the right sides of the rectangular notches 2022 and 2032 of the upper and the lower adjustable plates 202 and 203. The sizes of the center holes of the sleeves 2011, 2021 and 2031 respectively disposed at the left and the right sides of the base plate 201 and the upper and the lower adjustable plates are same; the center lines of the center holes at the left and the light sides are respectively aligned into one line and the two lines are parallel after assembly as FIG. 4 shows. In addition, screws exist in the center holes of only one pair of the sleeve 2021 at the right side of the upper adjustable plate 202 and the sleeve 2031 at the left side of the lower adjustable plate 203, and the sleeve 2021 at the left side of the upper adjustable plate 202 and the sleeve 2031 at the fight side of the lower adjustable plate 203 and can be extended out of them to screw thread portions 2023 and 2033 to strengthen the moving stability when the upper and the lower adjustable plates driven by a bolt 205. For convenience in explanation, the former structure is adopted in FIGS. 3 and 4, i.e. the screw threads are only disposed in the center holes of the sleeve 2021 at the right side of the upper adjustable plate 202 and the sleeve 2031 at the left side of the lower adjustable plate 203. And, no screw thread exists in the center holes of all the sleeves on the base plate 201.

Please refer to FIG. 4. When the base 201 and the upper and the lower adjustable plate 202 and 203 want to be assembled to a lens filtering mask, the upper and the lower adjustable plates 202 and 203 are first placed between the upper and the lower sleeves 2011 on the base plate 201. Next, two bolts 205 are respectively inserted into the sleeves 2011, 2021, 2031 and 2011 disposed into one straight line at the two sides of the base plate and the upper and the lower adjustable plates 202 and 203. Fixing washers 207 are then engaged with end parts 2052 of the bolts 205 to prevent the assembling elements from falling down after the bolts 205 are passed through the lowermost end of the sleeve 2011, for conforming to a different aspect of projection picture, only rotate a rotating button on the bolt 205, and the left sleeve 2021 on the upper adjustable plate 202 engaged with the bolt 205 or/and right sleeve 2031 on the lower adjustable 203 can then be driven to move the upper or/and lower adjustable plate/plates upwards or downward to change the size of a close rectangular hole formed by the open type rectangular notches 2022 and 2032. Generally speaking, the ratio of the length and the width of the adjusted close rectangular hole can be an aspect ratio of a general projection picture such as 4:3, 16:9, 2.35:1 or anything else.

Figure 5:
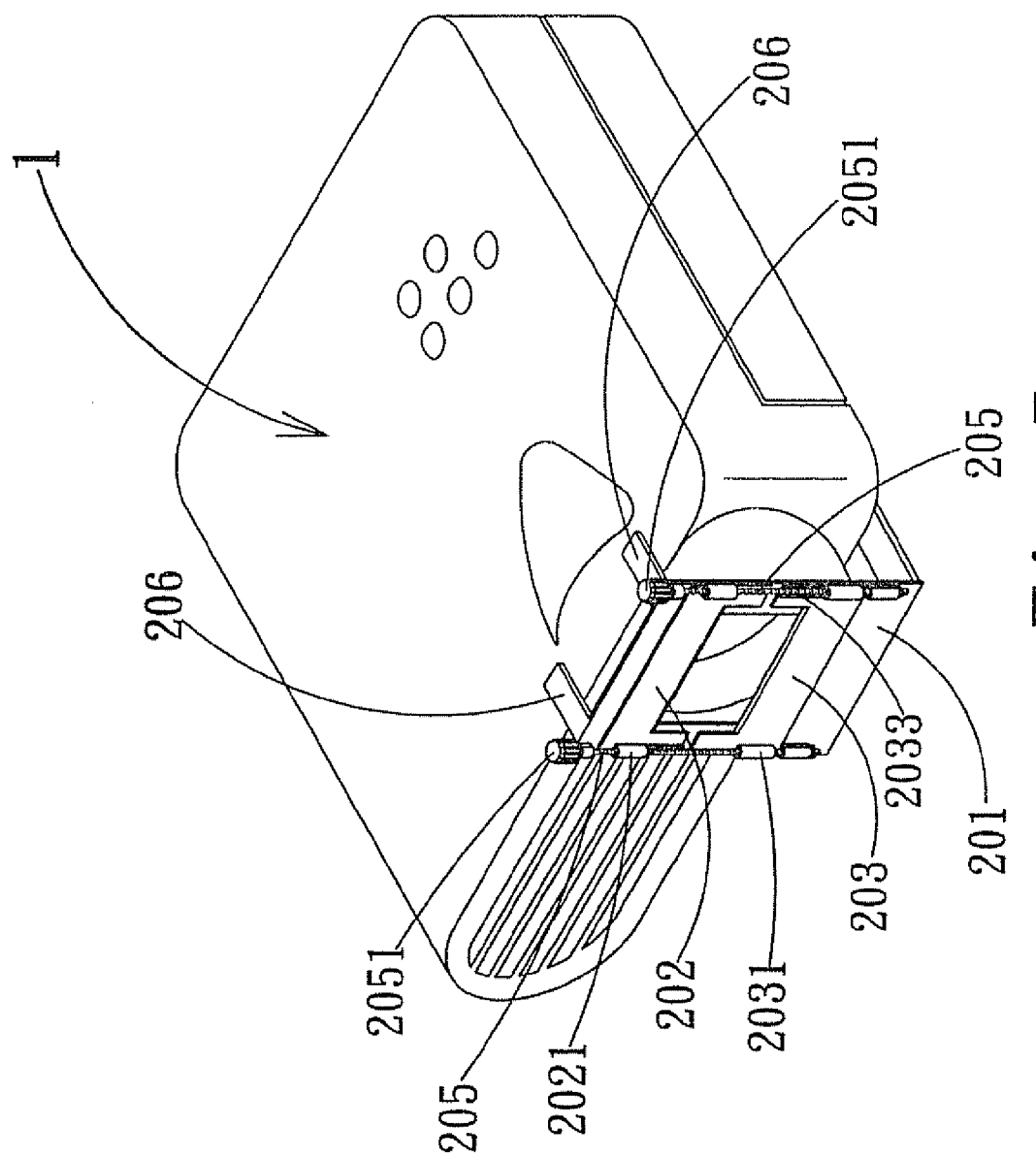
FIG. 5 is a schematic view, showing a motion for mounting a lens shielding mask with a fixed type optical grating onto a projection apparatus.

Please refer to FIG. 5, FIG. 5 is a schematic view showing a lens shielding mask is mounted on a projector according to the present invention. When the lens shielding mask 20 wants to be mounted on the projector 1, holding sheets on the base plate 201 are respectively clamped at the upper and the lower rims of the projector close to the projection lens 2 and the ratio of the length and the width of the close rectangular hole is adjusted according to the steps mentioned above to conform to the aspect ratio of a projection picture.

Figure 6:
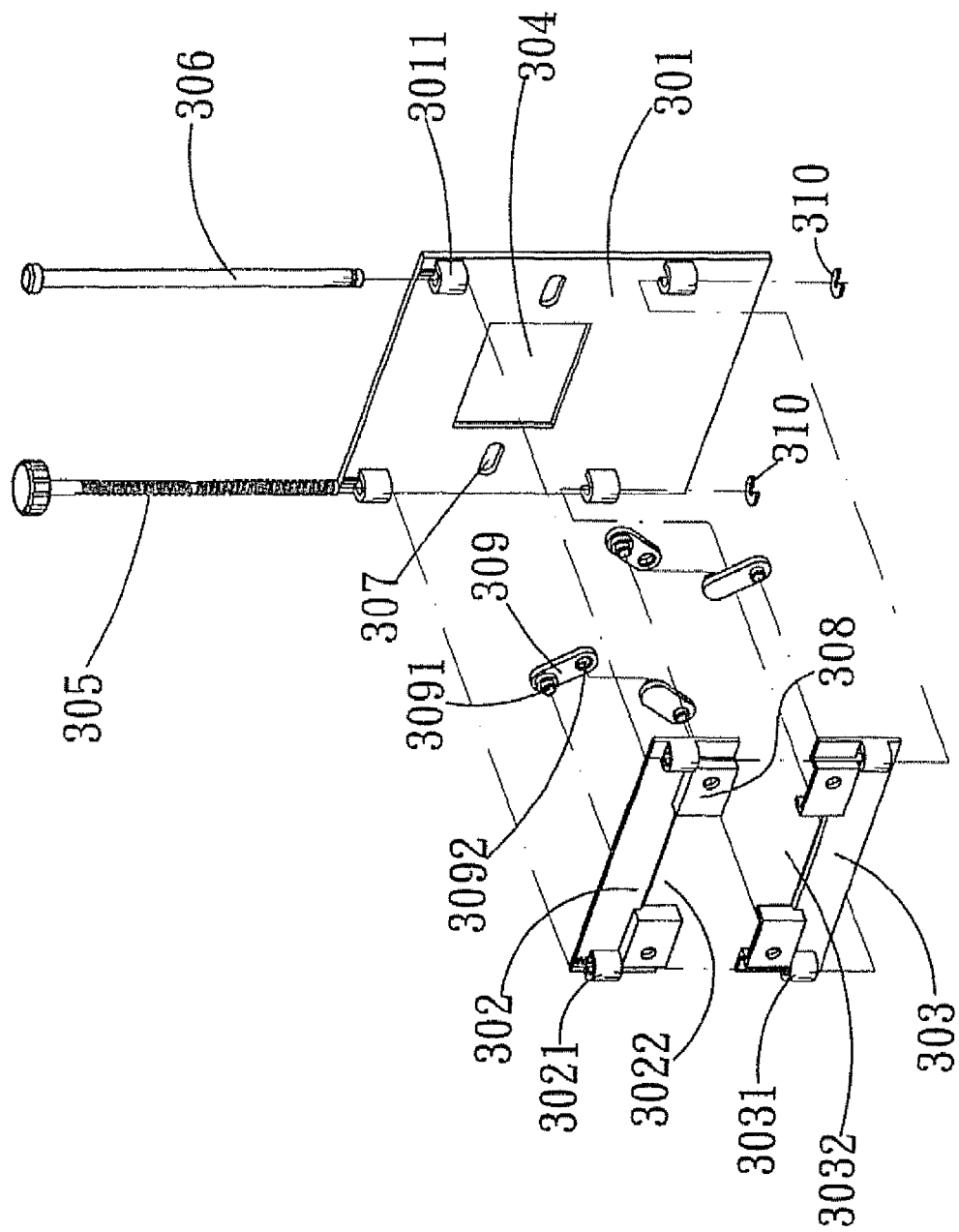
FIG. 6 is an explosive view, showing a lens shielding mask with an adjustable optical grating of still another preferred embodiment according to the present invention.
Figure 7:
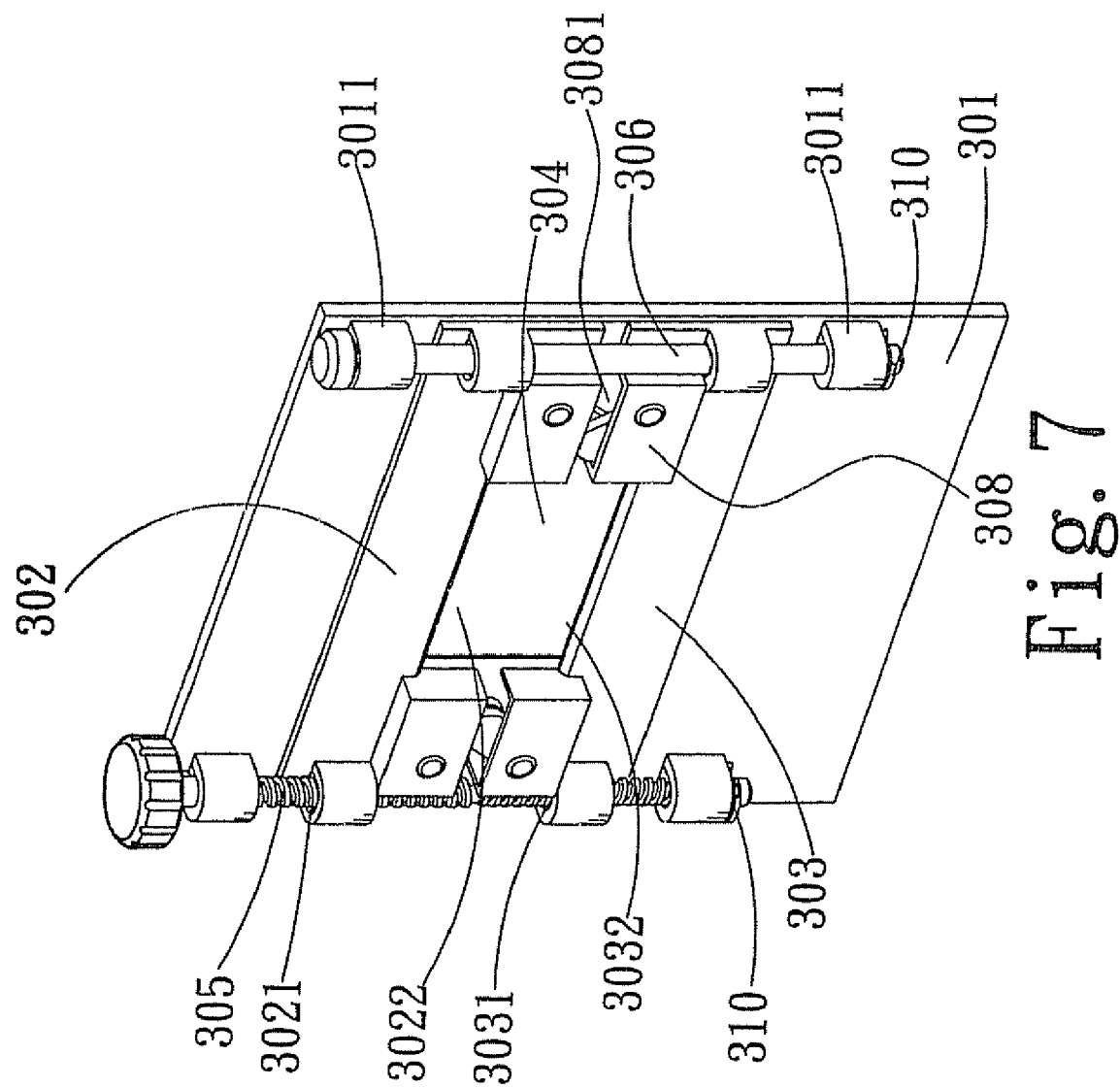
FIG. 7 is a cross sectional view, showing an assembled lens shielding mask with an adjustable optical grating of still another embodiment according to the present invention.

Please refer to FIGS. 6 and 7. FIGS. 6 and 7 are explosive and cross sectional views respectively showing parts and after-assembly structure of a lens shielding mask with an adjustable optical grating of still another preferred embodiment according to the present invention. A lens shielding mask 30 with an adjustable optical grating comprises a base plate 301 and upper and lower adjustable plates 302 and 303. A sleeve 3011 is disposed on every corner of the base plate 301; no screw thread is existed in any one of these four sleeves. A rectangular hole 304 is further opened in the base plate 301; the disposition location is identical to the rectangular hole 204 in the last preferred embodiment mentioned above so that the detail thereof is omitted here. Furthermore, in the base plate 301, two guide notches 307 are disposed at the lateral center line of the rectangular hole 304 and adjacent to the two flank sides of the base plate. Two open type rectangular notches 3022 and 3032, which are corresponding to each other and have a same size, are respectively disposed in the middles of the lower end of the upper adjustable plate 302 and the upper end of the lower adjustable plate 303; the width of the open type rectangular notches are almost equal to the one of the rectangular hole in the base plate. And, a lever plate connecting seat 308 is respectively disposed at each one of the two sides of the open type rectangular notches of the upper and the lower adjustable plates 302 and 303; an accepting hole 3081 is opened in each connecting seat 308. Both of sleeves 3021 and 3031 are respectively disposed at the left and the right sides of the upper and the lower adjustable plates 302 and 303. The sizes of the center holes of the sleeves at the same sides are equal, and screw threads are disposed in the center holes of the sleeves at the same side; the threads are disposed in the center holes of the sleeves at the left sides of the plates according to the present invention only for explaining the detail easily.

The assembling of the lens filtering mask 30 according to the present invention can be seen in FIG. 7. First, a buckling pin 3091 disposed on a lever plate shown in FIG. 6 is buckled into the accepting hole 3092 disposed in a corresponding and the end of the buckling pin 3091 is engaged into the guide notch 307, and then another buckling pin 3091 on each lever plate is engaged into the accepting hole 3081 in the each connecting seat 308 on the upper and the lower adjustable plate 302 and 303. Each connecting point after being connected including the one between the lever plates 309 and the one between the lever plate 309 and connecting seat 308 is pivotally connected. Thereafter, the whole set of after-combination upper and lower adjustable plates 302 and 303 and the lever plate 309 are mounted between the upper and the lower sleeves 3011 on the base plate 301. After the center holes of the sleeves 3011, 3021, 3031 and 3011 on the left and right sides of the base plate 30 and the upper and the lower adjustable plates 302 and 303 are aligned, a bolt with both of left and right screw threads respectively disposed on the upper and the lower parts thereof and a straight shaft shown in FIG. 6 are respectively inserted into the left and the right sides of sleeve arrays. Fixing washers are used to engage respectively with both ends of the bolt 305 and the straight shaft 306 to prevent all the assembling elements from dropping after the bolt 305 and the straight shaft 306 are passed through the lowermost end of the sleeve 3011 the upper and the lower adjustable plates 302 and 303 can be closed and opened synchronically to adjust the size of the close opening formed by the open type rectangular notches 3022 and 3032 to conform to the size of the projection picture after the bolt with left and right screw threads respectively disposed on the upper and the lower parts thereof is engaged with the sleeves 3021 and 3031 in which the threads in the center holes of them are reverse to each other respectively disposed on the left sides of the upper and the lower adjustable plates. The coordination of the lever plates 309 and guide notches 307 and the coordination of the straight shaft 306 and the sleeves on the right side are operated to guide the upper and the lower adjustable plates 302 and 303 to move up and down smoothly.

Furthermore, the thread of the center holes of the sleeves at the left side can also be extended to the outsides of the sleeves to increase the driven stability of the upper and the lower adjustable plates, it is the same situation as described in the preferred embodiment of the present invention mentioned above.

Besides, the holding element used in the preferred embodiment mentioned above can also be used in this preferred embodiment for mounting convenience. The detail for mounting the mask on a projector is also omitted here because it is not different from the situation mentioned in the last preferred embodiment.

It is noted that the outer suspension type lens shielding mask for a projection apparatus described above is the preferred embodiments of the present invention for the purpose of illustration only, and are not intended as a definition of the limits and scope of the invention disclosed. Any modifications and variations that may be apparent to a person skilled in the art are intended to be included within the scope of the present invention

What is claimed is:

1. An outer suspension type lens shielding mask for a projection apparatus, comprising:
    a base plate, wherein a rectangular hole is opened therein;
    at least one upper adjustable plate and one lower adjustable plate, installed on said base plate, and two corresponding open type rectangular notches being respectively disposed in the middle of the lower end of said upper adjustable plate and the upper end of said lower adjustable plate; and
    at least one adjustment apparatus, constituted by a plurality of connecting elements connected to said plate and said upper and said lower adjustable plates for the relative positions of said upper and said lower adjustable plates to be adjusted on said base plate;
    wherein said connecting elements are sleeves and said sleeves are respectively disposed on the corners of said base plate and the left and the right side of said upper and said lower adjustable plates to form two arrays of sleeves and said all sleeves on said two arrays are aligned one another; and
    wherein screw threads are only disposed in one of said two arrays of aligned sleeves on the left and the right sides of the upper and the lower adjustable plates and said screw threads in the upper and the lower sleeves of said array are reverse, said adjustment apparatus is a bolt and a straight shaft without screw threads, said bolt is passed through said sleeves with screw threads and said straight shaft is passed through said sleeves without screw threads, and said screw threads on the upper and the lower sections of said bolt are reverse, said reverse screw threads are respectively matched up with said corresponding screw threads in said sleeves.

2. The lens shielding mask according to claim 1, wherein said upper and said lower adjustable plates are pulled apart from or close to each other to adjust the size of an opening formed by said rectangular hole and said open type rectangular notches by a pair of lever sets installed on said base plate and connected respectively to the right and the left sides of the upper and the lower adjustable plates.

3. The lens shielding mask according to claim 1, wherein screw threads are respectively extended out of said one pair of threaded sleeves on said upper and said lower plates.

* * * * *